United States Patent
Tatsuzawa (10) Patent No.: US 6,441,844 B1
(45) Date of Patent: Aug. 27, 2002

(54) SOLID-PICTORIAL VIDEO SIGNAL GENERATING APPARATUS, SOLID-PICTORIAL VIDEO SIGNAL TRANSMITTING APPARATUS, SOLID-PICTORIAL VIDEO SIGNAL RECEIVING APPARATUS AND SOLID-PICTORIAL VIDEO SIGNAL TRANSMISSION SWITCHING APPARATUS

(75) Inventor: Kaichi Tatsuzawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/296,366

(22) Filed: Apr. 22, 1999

Related U.S. Application Data (63) Continuation of application No. PCT/JP98/03766, filed on Aug. 25, 1998.

(30) Foreign Application Priority Data

Aug. 25, 1997 (JP) ............................................. 9-228611

(51) Int. Cl.$^7$ ................................................. H04N 7/18
(52) U.S. Cl. ............................ 348/42; 348/42; 348/43; 348/47; 375/240.17
(58) Field of Search ................................. 348/416, 415, 348/413, 699, 412, 42, 43, 47, 48, 46; 375/240.12–240.17

(56) References Cited

U.S. PATENT DOCUMENTS

| | | | | |
|---|---|---|---|---|
| 5,619,256 A | * | 4/1997 | Haskell et al. | 348/43 |
| 5,625,408 A | * | 4/1997 | Matsugu et al. | 348/42 |
| 5,652,616 A | * | 7/1997 | Chen et al. | 348/43 |
| 5,696,551 A | * | 12/1997 | Katto | 348/43 |
| 5,727,078 A | * | 3/1998 | Chupeau | 348/43 |
| 5,850,352 A | * | 12/1998 | Moezzi et al. | 348/13 |
| 6,055,012 A | * | 4/2000 | Haskell et al. | 348/48 |
| 6,055,274 A | * | 4/2000 | McVeigh | 374/240 |
| 6,104,425 A | * | 4/2000 | Kanno | 348/43 |
| 6,084,979 A | * | 7/2000 | Kanade et al. | 348/48 |
| 6,163,337 A | * | 12/2000 | Azuma et al. | 348/43 |

FOREIGN PATENT DOCUMENTS

| | | |
|---|---|---|
| JP | 63-86691 | 4/1988 |
| JP | 2-50689 | 2/1990 |
| JP | 6-153239 | 5/1994 |
| JP | 7-95621 | 4/1995 |
| JP | 8-265776 | 10/1996 |
| JP | 8-321992 | 12/1996 |

* cited by examiner

*Primary Examiner*—Andy Rao
(74) *Attorney, Agent, or Firm*—Frommer Lawrence & Haug LLP; William S. Frommer; Glenn F. Savit

(57) ABSTRACT

Left and right video cameras 18L and 18R are disposed on both sides of a front video camera 18M. Solid-pictorial video signals used upon signal transmission are generated by using video signals outputted from the left and right video cameras with respect to a video signal outputted from the front video camera. The left and right video cameras make use of simplified video cameras and are cameras with no zoom functions or the like. The video signals obtained from the left and right video cameras are used as signals for forming a solid picture. In the present example, only solid information with respect to a main picture is transmitted as a video signal to reduce the amount of transmission. A motion-compensated DCT encode process using the front video signal as a reference picture is performed to extract only the video signal having the solid information from the left and right video signals. Since the simplified video cameras can be utilized, solid-pictorial video signals can be generated at low cost.

3 Claims, 10 Drawing Sheets

LEFT AND RIGHT

SOLID-PICTORIAL VIDEO SIGNAL GENERATING APPARATUS, SOLID-PICTORIAL VIDEO SIGNAL TRANSMITTING APPARATUS, SOLID-PICTORIAL VIDEO SIGNAL RECEIVING APPARATUS AND SOLID-PICTORIAL VIDEO SIGNAL TRANSMISSION SWITCHING APPARATUS

This is a continuation of copending International Application PCT/JP98/03766 having an international filing date of Aug. 25, 1998.

TECHNICAL FIELD

This invention relates to a solid-pictorial video signal generating apparatus wherein three television cameras placed close to each other are used, a picture obtained from the central video camera is used as a main picture and the remaining pictures obtained from the other cameras are respectively pictures used for generation of a solid picture, whereby solid-pictorial video signals can be generated in a simple configuration. This invention also relates to a solid-pictorial video signal transmitting apparatus and a solid-pictorial video signal receiving apparatus capable of transmitting and receiving the solid-pictorial video signals, and a solid-pictorial video signal transmission switching apparatus.

BACKGROUND ART

Figure 15:
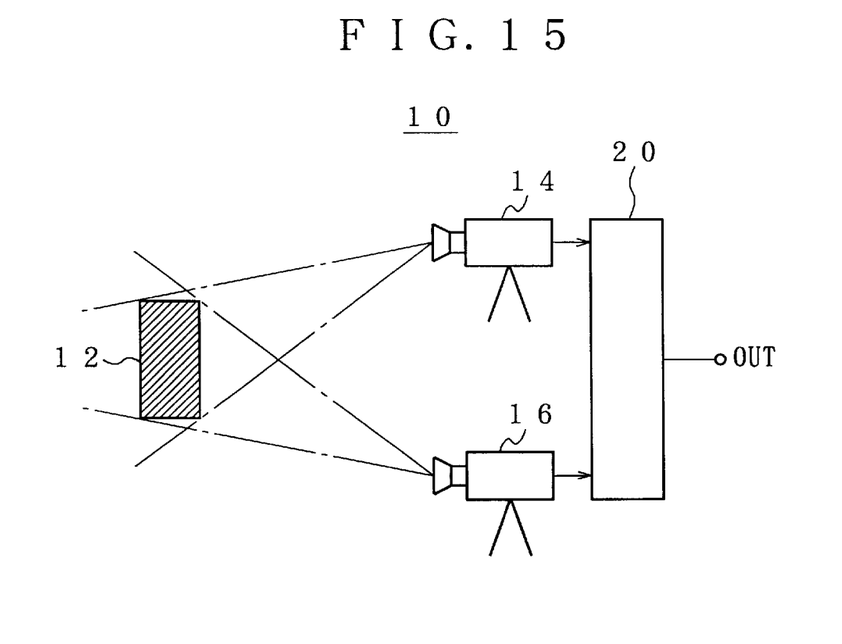
FIG. 15 is a systematic diagram of a conventional solid-pictorial video signal generating apparatus.

The projection of a solid picture onto the screen is normally implemented by processing images or pictures obtained from a plurality of video cameras (television cameras). As shown in FIG. 15 by way of example, the same object 12 is simultaneously imaged or photographed by two video cameras 14 and 16 installed within a studio while their camera angles are being changed. Two image or picture signals obtained by their imaging are supplied to a solid-pictorial video signal generating part 20 wherein they are subjected to suitable signal processing, thereby obtaining a solid picture. In this case, cameras identical in standards to each other are used as the two video cameras 14 and 16 to be used.

On the other hand, when the same object 12 is simultaneously imaged by the two video cameras 14 and 16 to generate the solid picture in this way, it is necessary to prepare two video cameras 14 and 16 identical in performance and characteristic to each other. Thus, when one attempts to vary the amount of zoom by the cameras each provided with a zoom function, it is necessary to control zooming of the two video cameras 14 and 16 in interlock with each other and control both to the same amount of zoom. In other words, controlled amounts of the two must completely be matched with each other.

If not done so, then the amounts of solid information about video signals obtained from the respective video cameras lack uniformity and an accurate solid picture cannot be generated. Of course, the approximately complete identity is required for all the functions mounted to the video cameras, including color characteristics of both the video cameras 14 and 16.

Thus, when one identical to an ordinary studio camera (in-station camera) is used as a video camera for a solid picture, adjustments to coincidences of camera various characteristics of the two become very cumbersome in terms of the coincidences of their characteristics. Their maintenance is very difficult. Further, when two video cameras are used, the relationship in which one is used as a master and the other is used as a slave, is not established. Thus, a video signal obtained from the other video camera cannot be used as an auxiliary video signal. Therefore, the entire apparatus inevitably increases in cost because a simplified camera with no zoom function or the like cannot be substituted for the other video camera.

Further, when the solid picture is stopped so as to be switched to an ordinary image or picture (plane picture), one hesitates as to which television camera should take priority over the other. This is because one and the other cannot be recognized as a main picture and a slave picture respectively since camera angles are divided into the left and right with respect to an object.

Even when it is desired to create a solid picture having special effects such as screen switching, wipe (sweep), etc., its operation is problematic when the same object is imaged from such uniform angles.

Therefore, the present invention solves such conventional problems and proposes a solid-pictorial video signal generating apparatus and the like, which provide low costs and easy solid form and provide the relationship of master and slave.

DISCLOSURE OF THE INVENTION

A solid-pictorial video signal generating apparatus according to the present invention is constructed such that left and right video cameras are placed on both sides of a front video camera, and solid-pictorial video signal used upon signal transmission is generated by using video signals outputted from the left and right video cameras with respect to a video signal outputted from the front video camera.

A solid-pictorial video signal transmitting apparatus according to the present invention comprises a front video camera, a pair of left and right video cameras placed with the front video camera interposed therebetween, a first encoder unit for processing a front video signal outputted from the front video camera, second and third encoder units for respectively effecting a compressing process on left and right video signals outputted from the pair of left and right video cameras while referring to the front video signal thereby to generate solid-pictorial video signals, a transport stream converter for converting the outputs of the respective encoder units to transport stream signals, a multiplexing unit for multiplexing the transport stream signals, and a signal transmitting unit for transmitting a multiplexed solid-pictorial video signal.

A solid-pictorial video signal receiving apparatus according to the present invention, for receiving a solid-pictorial video signal comprised of a front video signal and first and second solid-pictorial video signals each having a difference between each of left and right video signals and the front video signal, is constructed such that a left-pictorial video signal is generated from the front video signal and the first solid-pictorial video signal, a right-pictorial video signal is generated from the front video signal and the second solid-pictorial video signal, and the left-pictorial video signal and the right-pictorial video signal are supplied to a monitor simultaneously thereby to project a solid picture.

A video signal transmission switching apparatus according to the present invention is constructed such that it is supplied with at least first and second solid-pictorial video signals, and the first and second solid-pictorial video signals are supplied to a special effect generating circuit from which a video signal for a special effect is generated.

In the present invention, a solid picture using three video cameras is generated. In this case, the central video camera is used as a video camera for imaging or photographing the front of an object, and a main image or picture is generated from a video signal obtained therefrom. Therefore, a television camera or the like provided with various functions, which is normally used within a station, for example, is used as this video camera.

The left and right video cameras are placed on both sides of the front video camera in close proximity thereto. Simplified video cameras are used as the left and right video cameras. Further, cameras with no zoom function are utilized as the left and right video cameras. Video signals obtained from the left and right video cameras are used as signals for forming a solid image or picture. In the present example, only solid information with respect to the main picture is transmitted as a video signal to reduce the amount of transmission. Since a motion-compensated DCT encode process using the front video signal as a reference picture is performed to extract only the video signal having the solid information from the left and right video signals.

The left and right video signals having the solid information with respect to the main picture are combined with the front video signal thereby to result in a solid-pictorial video signal. The combined video signal is used upon both projections of the plane picture and the solid picture. The combined video signal is transmitted as a transport stream signal (digital data).

A received solid-pictorial video signal is separated into the front video signal and the left and right video signals and then restored to the original signal form. The left video signal reproduced from the front video signal is used as a left-pictorial video signal, whereas the right video signal reproduced from the front video signal is used as a right-pictorial video signal. These left-pictorial video signal and right-pictorial video signal are supplied to a solid monitor (e.g., goggle-type monitor means or the like) on which a solid picture is projected.

The video signal transmitting apparatus is equipped with a transmission switching unit for providing special effects and implements a special effect process between solid pictures. Since, in this case, respective information about at least left and right video signals are compressed using a compression coding process such as MPEG or the like, the respective compressed information are combined into one as they are or selected upon execution of two-screen synthesis or the like.

BEST MODE FOR CARRYING OUT THE INVENTION

Embodiments of a solid-pictorial video signal generating apparatus and the like according to the present invention will continuously be described in detail with reference to the accompanying drawings.

Figure 1:
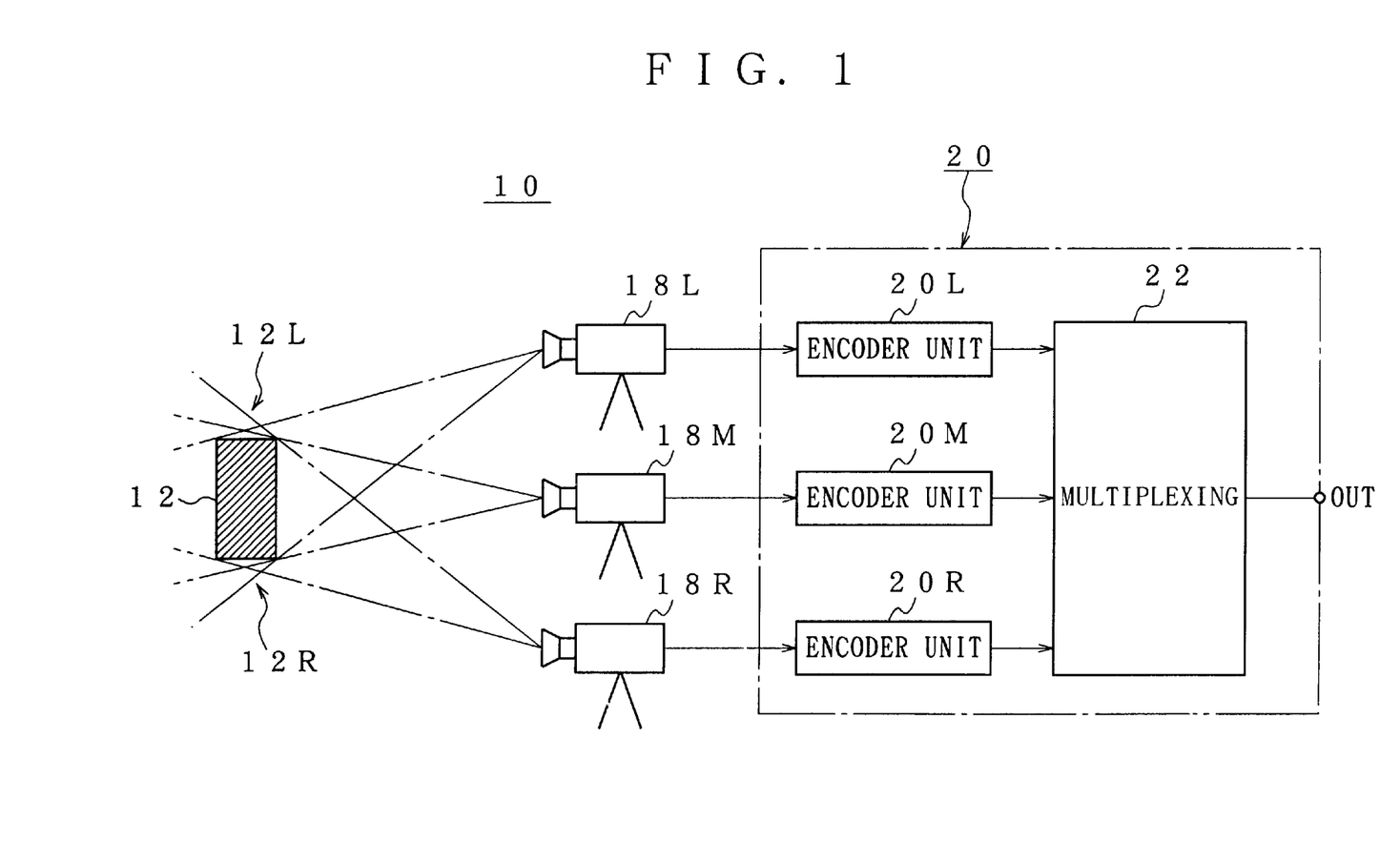
FIG. 1 is a fragmentary systematic diagram showing one embodiment of a solid-pictorial video signal generating apparatus according to the present invention.

FIG. 1 is a conceptual diagram of one embodiment of a solid-pictorial video signal generating apparatus 10 according to the present invention. In the present invention, three video cameras 18M, 18L and 18R are used to image the same object 12. Solid-pictorial video signals used for signal transmission are generated from video signals (front video signal and left and right video signals) obtained from the video cameras.

In such a case, the central video camera 18M is used as a video camera for photographing the front of the object 12. A main picture or image (plane picture) is generated from a video signal SM (see an original picture or image in FIG. 2A) obtained from the video camera. Therefore, a television camera or the like equipped with such various functions as normally used within a station, for example, can be used as the video camera 18M. A news-gathering video camera may be used as the video camera 18M.

A pair of left and right video cameras 18L and 18R are placed on both sides of the front video camera 18M in close proximity to the video camera 18M. The left and right video cameras 18L and 18R are spaced uniformly and fixed at the same angle respectively. In the present embodiment, the left and right video cameras 18L and 18R are also placed on a base (not shown) on which the front video camera 18M is mounted.

The left and right video cameras 18L and 18R make use of simplified video cameras and are equivalent to cameras with no zoom functions or the like. This is because when video cameras identical to the front video camera 18M are used, problems such as processing for synchronism between the video cameras, the match between camera characteristics, etc. as in the prior art must be solved.

Figure 2A:
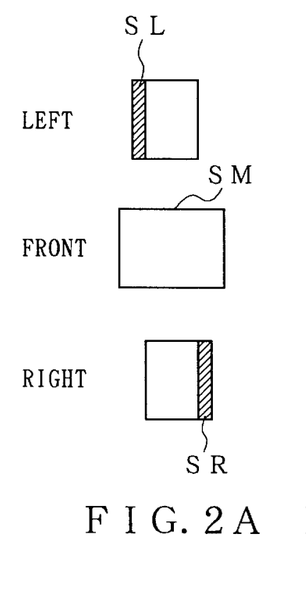
FIGS. 2A through 2C are respectively diagrams for describing the operation of the solid-pictorial video signal generating apparatus shown in FIG. 1.

Now, images or pictures (indicated by SL and SR for their convenience) of left and right video signals SL and SR imaged by the left and right video cameras 18L and 18R coincide with the front picture SM in vertical size of the object 12 where the three cameras are identical to each other in magnification, but do not coincide with it in horizontal size thereof as shown in FIG. 2A.

The front video signal SM and left and right video signals SL and SR obtained from the three video cameras 18 are supplied to a video signal generating part 20, and then they are converted into signal form suitable for signal transmission. The video signal generating part 20 is provided with encoder units 20M, 20L and 20R and performs an image size process, a compression process, etc.

The left and right video signals SL and SR having image sizes shown in FIG. 2A are obtained from the left and right video cameras 18L and 18R. The encoder units 20L and 20R perform a processing such that the left and right pictures coincide in vertical direction with the front picture (the horizontal directions thereof do not coincide with each other), i.e., they process, as pre-treatment, the vertical sizes of the left and right pictures so as to coincide with that of the front picture.

Figure 2B:
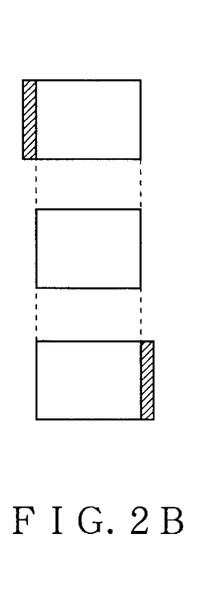
Figure 2C:
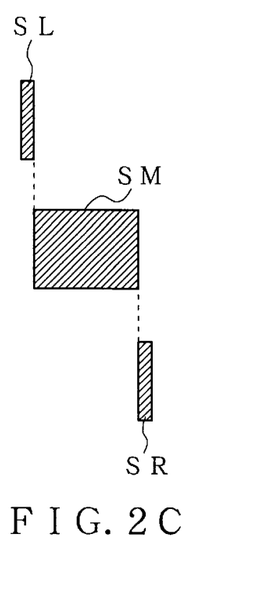

Thereafter, information indicative of solid portions of the left and right pictures is extracted using the front picture. This is because solid information about a left side 12L of the object 12 shown in FIG. 1 is contained in the left picture (as diagonally shaded in FIG. 2B) and solid information about a right side 12R of the object 12 is contained in the right picture (as diagonally shaded in FIG. 2B). Since common image information with respect to the object 12 is omitted where possible upon sending (transmitting) the video signals for the solid picture, the difference between the left and right pictures and the front picture as a reference image or picture is extracted (see FIG. 2C) and information about the extracted difference is subjected to compression processing or the like and superimposed on the front picture, after which the result of superimposition is transmitted.

Figure 3:
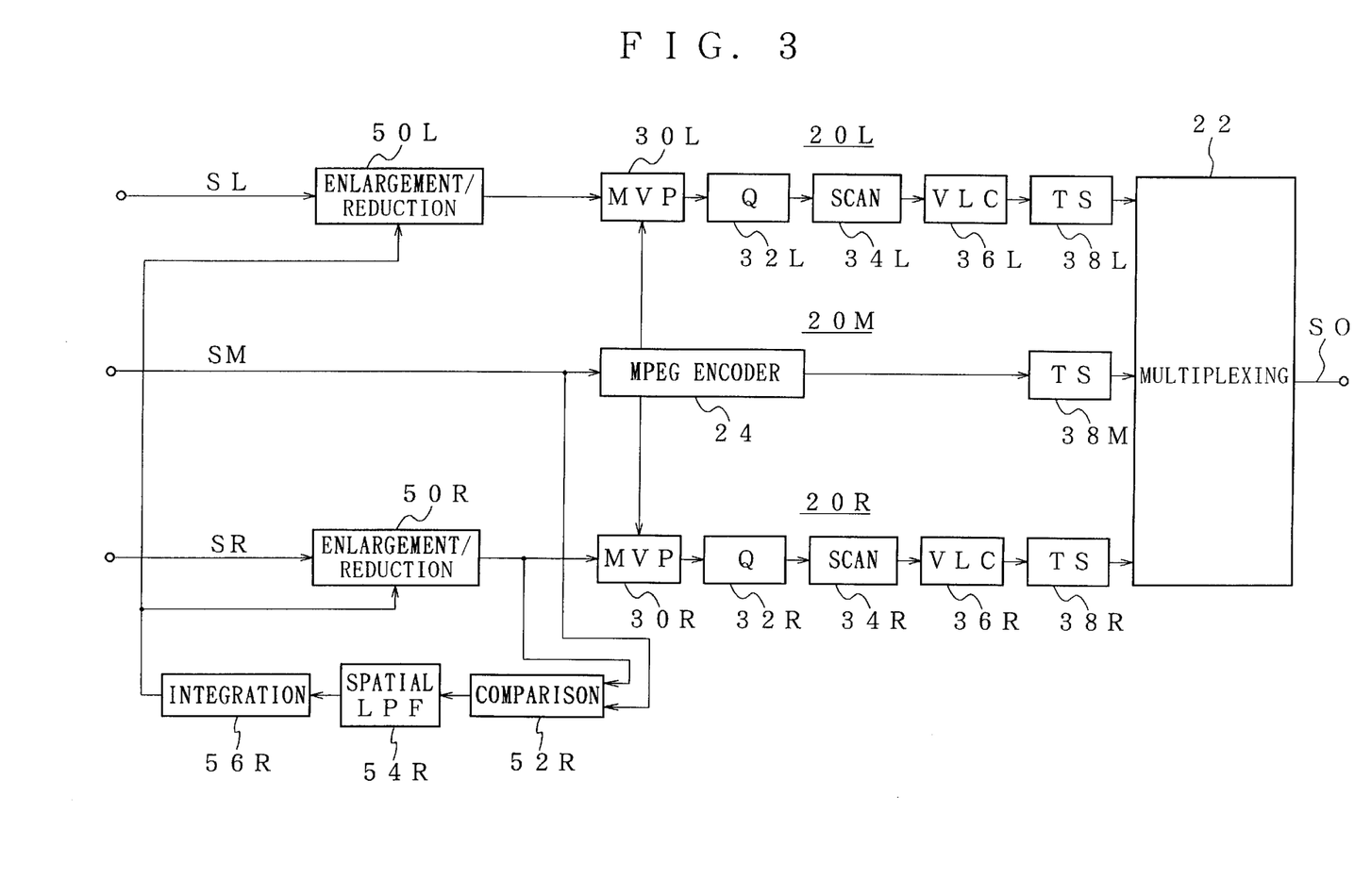
FIG. 3 is a systematic diagram illustrating one example of the periphery of an encoder unit.

FIG. 3 shows specific examples of these encoder units 20M, 20L and 20R. Pre-processing circuits 50L and 50R make image-size adjustments to the left and right video signals SL and SR. In the present examples, a pre-processed output of the right video signal SR is compared with the front video signal SM as the reference by a comparison circuit 52R. Only a low-frequency component is extracted from its compared output by a spatial low-pass filter 54R. Further, the extracted low-frequency component is integrated by an integrating circuit 56R from which the so-integrated output is supplied commonly to the enlargement/reduction circuits 50R and 50L serving as pre-processing in the present examples.

Figure 13:
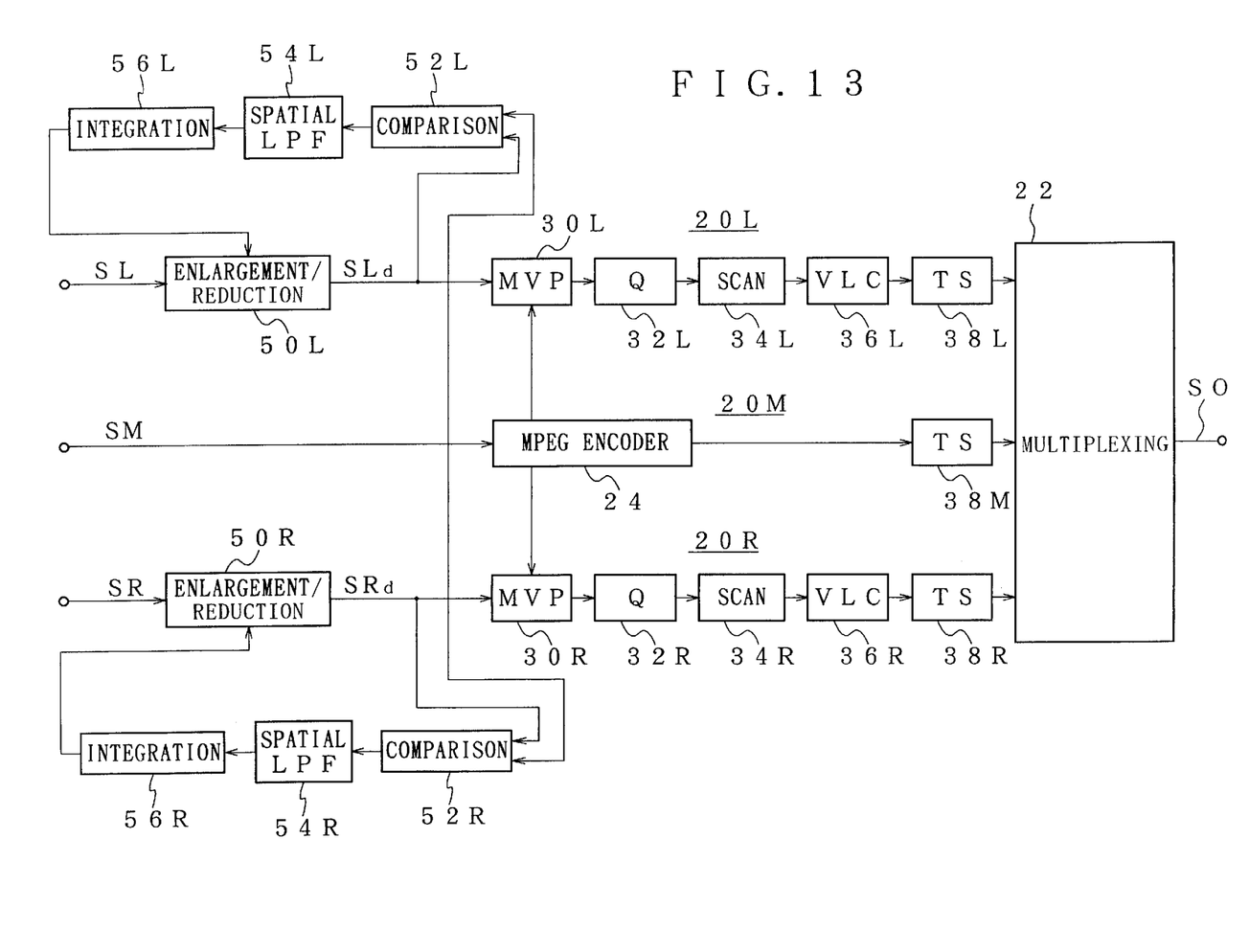
FIG. 13 is a systematic diagram showing another example of an encoder unit.

Thus, a feedback loop is formed so that the image sizes of the left and right video signals SL and SR coincide with the image size of the front video signal SM. While the enlargement/reduction circuits 50L and 50R are commonly controlled by the integrated output in the present examples, the left video signal and the right video signal may be controlled by different feedback loops as shown in FIG. 13 by way of example.

In this case, the feedback loop with respect to the enlargement/reduction circuit 50L is also constructed in a manner similar to that with respect to the enlargement/reduction circuit 50R. Therefore, an encoder unit has a spatial low-pass filter 54L and an integrating circuit 56L starting with a comparison circuit 52L for making a comparison between a front video signal and a right video signal. The encoder unit constructed as shown in FIG. 13 rather than constructed as shown in FIG. 3 is high in control accuracy.

Now, the front video signal SM is supplied to an MPEG (Moving Picture Experts Group) encoder 24 constituting the encoder unit 20M in the present examples as shown in FIG. 3, wherein it is compressed and encoded. Since the MPEG encoder 24 can make use of the known configuration, its detailed description will be omitted. When it is not compressed and encoded, the present encoder 24 becomes unnecessary.

With respect to the left and right video signals SL and SR, the difference between each of the left and right video signals SL and SR and the front video signal is compressed and encoded. Therefore, the left and right encoder units 20L and 20R are respectively provided with motion-compensated DCT (Discrete Cosine Transform) encoder parts 30L and 30R. The front video signal SM is supplied to the motion-compensated (predicted code-processed) DCT encoder parts 30L and 30R as a reference picture or image signal.

Figure 4:
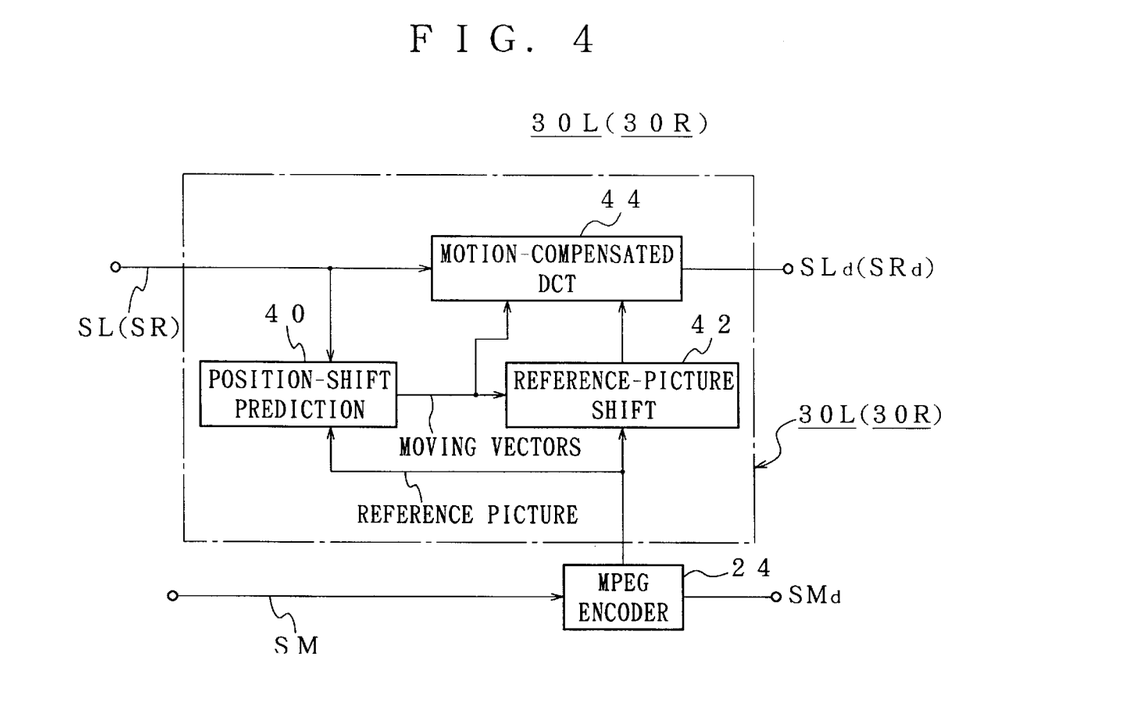
FIG. 4 is a systematic diagram depicting one example of a motion-compensated DCT encoder part.

FIG. 4 shows specific examples of the motion-compensated DCT encoder parts 30L and 30R. Left and right video signals (left and right pictures) and a front video signal (front picture) are supplied to a position-shift prediction circuit 40 wherein shifts in the positions of the left and right pictures are predicted with the front picture as a reference picture or image. Moving vectors corresponding to the result of prediction are supplied to a reference image shift circuit 42 wherein the reference picture is shifted according to the moving vectors.

The shifted reference picture is supplied to a motion-compensated DCT converter 44 together with the moving vectors and the difference between the reference picture and the left (right) picture is determined based the shifted reference picture. Further, the DCT converter 44 performs a DCT converting process on information about the difference and effects a prediction encoding process with motion compensation on it. That is, the DCT converting process and the prediction encoding process are effected on the difference information shown in FIG. 2C.

Figure 5:
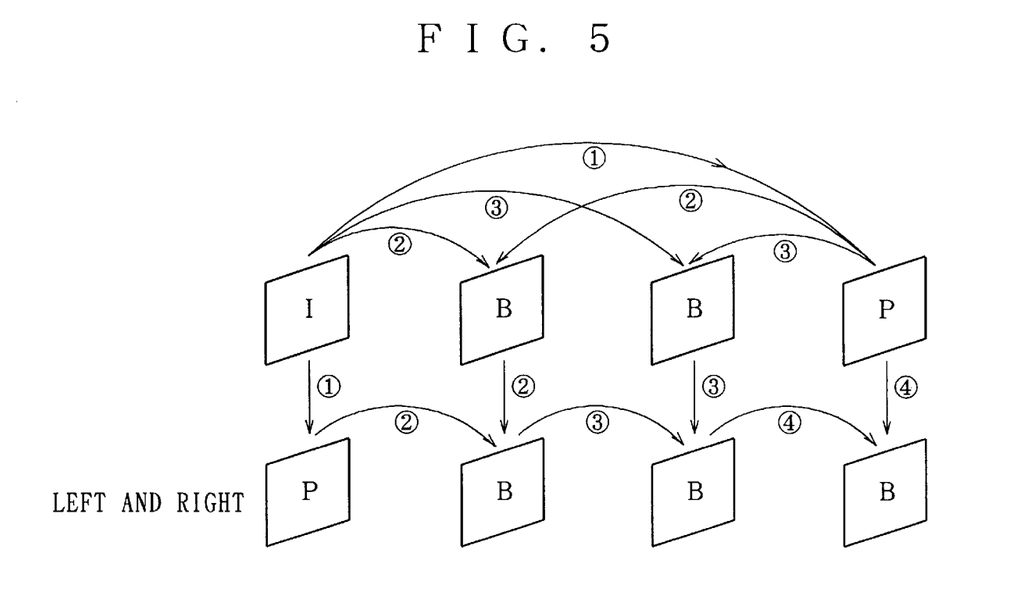
FIG. 5 is a diagram showing the relationship between I/P/B pictures.

FIG. 5 shows a specific example of prediction encoding. The present example corresponds to a processing example wherein a cycle M that an I picture (Intra-Picture) or a P picture (Predictive-Picture) appears on a front picture, is selected as M=3.

The front picture is subjected to a process including the I picture. After three frames, the P picture appears and a B picture (Bidirectionally Predictive-Picture) is generated using the I picture and P picture with respect to a frame therebetween. With respect to the left and right pictures in contrast to this, P and B pictures are generated as shown in the drawing by utilizing I, P and B pictures for the front picture.

DCT coefficients outputted from the DCT encoder parts 30L and 30R are respectively quantized by quantization circuits 32L and 32R using a predetermined value Q. While their quantized outputs are being scanned by scanning circuits 34L and 34R in zigzag patterns shown in FIG. 6., they are subjected to a variable-length encoding process together with moving vectors by variable-length coding circuits (VLC) 36L and 36R provided at subsequent stages. Thereafter, the so-processed outputs are respectively converted into transport stream signals (digital data) defined under MPEG standards by transport stream converters 38L and 38R.

A front video signal (variable-length coded output) outputted from the MPEG encoder 24 is also subjected to a transport stream process by a transport stream converter 38M and then supplied to a multiplexing circuit 22 wherein it is brought to one transport stream signal SO. This results in a solid-pictorial video signal used for transmission.

Figure 7:
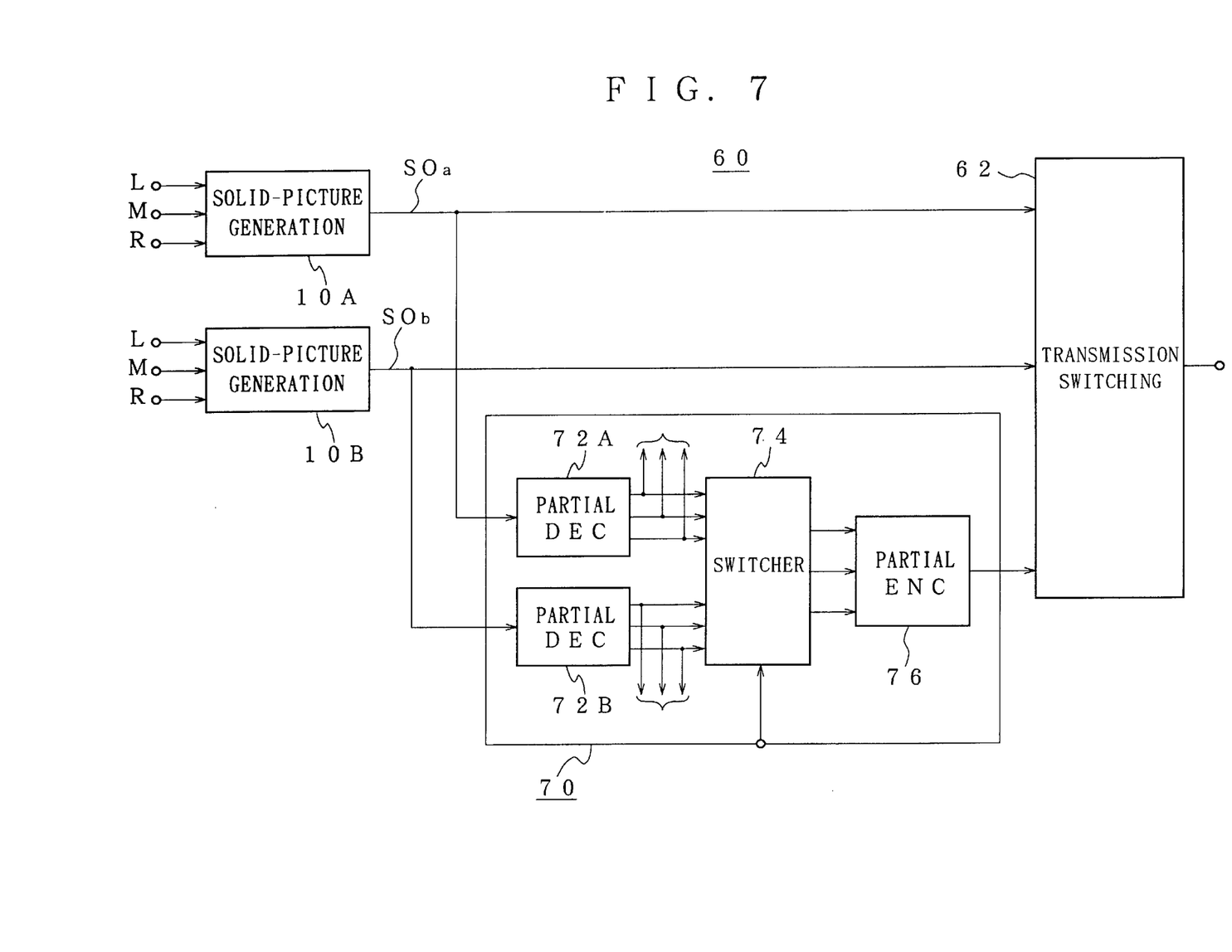
FIG. 7 is a systematic diagram illustrating one embodiment of a solid-pictorial video signal transmitting apparatus according to the present invention.

FIG. 7 shows one embodiment of a device 60 for transmitting a plurality of solid-pictorial video signals. The present embodiment is one wherein transmission switching between two-system video signals for solid images and transmission switching between output signals obtained by performing a special effect process on the two-system video signals for solid images can be implemented.

In the same drawing, two solid-pictorial video signal generating apparatuses 10A and 10B are provided. A front video signal SM and left and right video signals SL and SR, imaged by the video cameras shown in FIG. 1, are respectively supplied to them from which solid-pictorial video signals SOa and SOb set to the above-described transmission form, are generated. These video signals SOa and SOb are supplied to a transmission switching unit 62.

These video signals SOa and SOb are supplied also to a special effect generating unit 70. Since the present embodiment permits the special effect process without performing a decoding process on data about the video signals SOa and SOb, partial decoders 72A and 72B are respectively provided at a stage prior to a video switcher 74 wherein a switching process for special effects is performed on partial decode outputs.

The special-effect output signals subjected to the switching process are encoded by a partial encoder 76 provided at subsequent stage thereof from which the encode-processed signals are outputted as a solid-pictorial video signal subjected to the special effect process. This is supplied to the transmission switching unit 62 wherein a process for switching between the solid-pictorial video signals is performed, based on a command issued from a control panel (not shown) with a computer built therein.

The above-described video switcher 74 is also controlled by the computer, thus it is controlled by special-effect processing signals (two-screen changeover switching signal, wipe signal, etc.) instructed by an operator.

Figure 8:
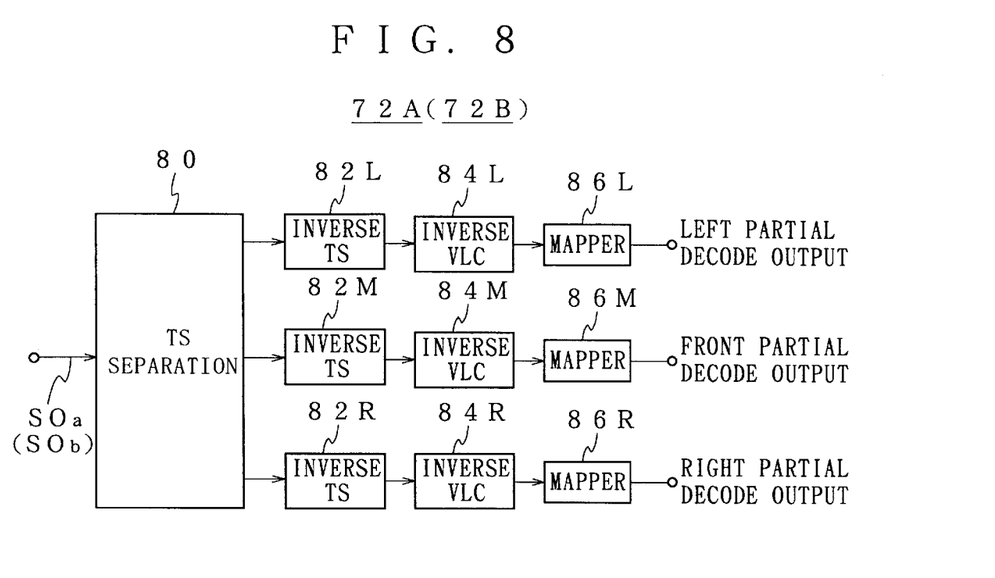
FIG. 8 is a systematic diagram of a partial decoder employed in a video signal transmission switching apparatus according to the present invention.

FIG. 8 shows one embodiment of the partial decoders 72A and 72B. A solid-pictorial video signal SOa or SOb represented in transport stream form is supplied to a separation circuit 80 so that it is restored to transport stream signals set every front and left and right video signals.

The respective video signals placed in the transport stream state are restored to states of variable-length codes by their corresponding stream inverse transformation circuits 82M, 82L and 82R. The variable-length codes are brought to quantized signals (digital data) by inverse variable-length coding circuits 84M, 84L and 84R. The quantized signals are scanned by mapping circuits (mappers) 86M, 86L and 86R in the zigzag patterns shown in FIG. 6 so that left and right pictorial data are respectively assigned to two-dimensional spatial regions together with front pictorial data, whereby front and left and right partial decode outputs are obtained. That is, a partial decode process is performed without performing a complete decode process. These partial decode outputs are supplied to the video switcher 74 wherein they are subjected to the special effect process.

The reason why even the left and right pictorial data are subjected to the special effect process by the switcher 74 after having been mapped in addition to the front pictorial data in the way, is that it is necessary to simultaneously effect the special effect process not only to the front pictorial data but also to the left and right pictorial data accompanied thereby, and in order to realize the above, it is necessary to process picture information after it has been temporarily restored to a two-dimensional space.

Of course, the special effect process may be performed after these compressed pictorial data are subjected to inverse DCT transformation so as to be restored (decoded) to the original pictorial data. However, if done so, then a pictorial-data compression coding/expansion decoding process must be performed before and after the special effect process, so that image quality is degraded. It is thus hard to say it as advisable processing means well.

Figure 6:
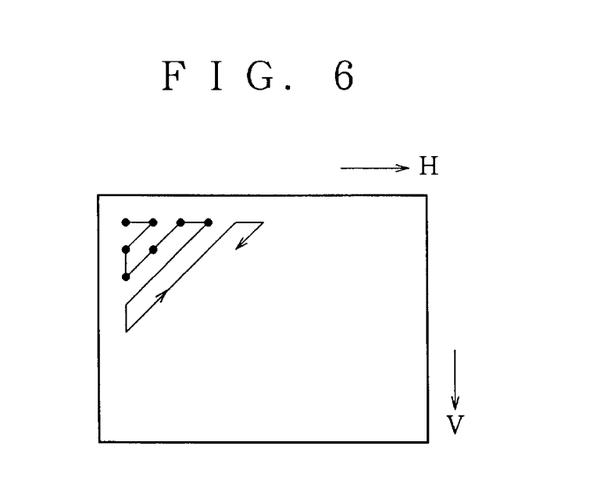
FIG. 6 is a diagram for describing one example of scanning.
Figure 9:
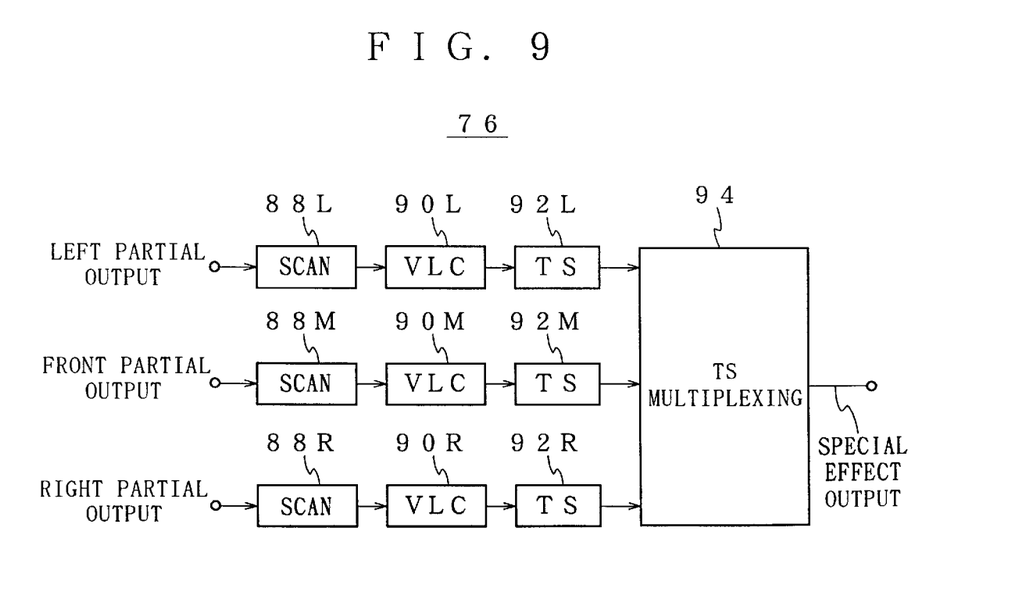
FIG. 9 is a systematic diagram of a partial encoder employed in the video signal transmission switching apparatus according to the present invention.

The partial decode outputs subjected to the special effect process and placed in a mixed state of two solid pictures are restored to the original transport stream signals by the partial encoder 76 shown in FIG. 9. Therefore, the respective partial decode outputs are scanned by scanners 88M, 88L and 88R as shown in FIG. 6, followed by supply to variable-length coding circuits 90M, 90L and 90R, so that they are subjected to a variable-length coding process. Thereafter, they are converted to transport stream signals for MPEG by transport stream transformation circuits 92M, 92L and 92R respectively. The converted transport stream signals are multiplexed by a multiplexing circuit 94, so that a solid-pictorial video signal with the special effect process is obtained. This solid-pictorial video signal is a signal identical to the video signals SOa and SOb produced from the solid-pictorial video signal generating apparatuses 10A and 10B.

Figure 10:
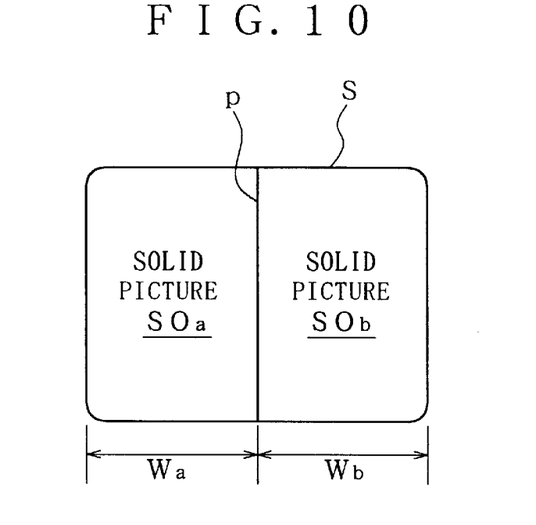
FIG. 10 is a diagram showing an example of a solid screen.
Figure 11:
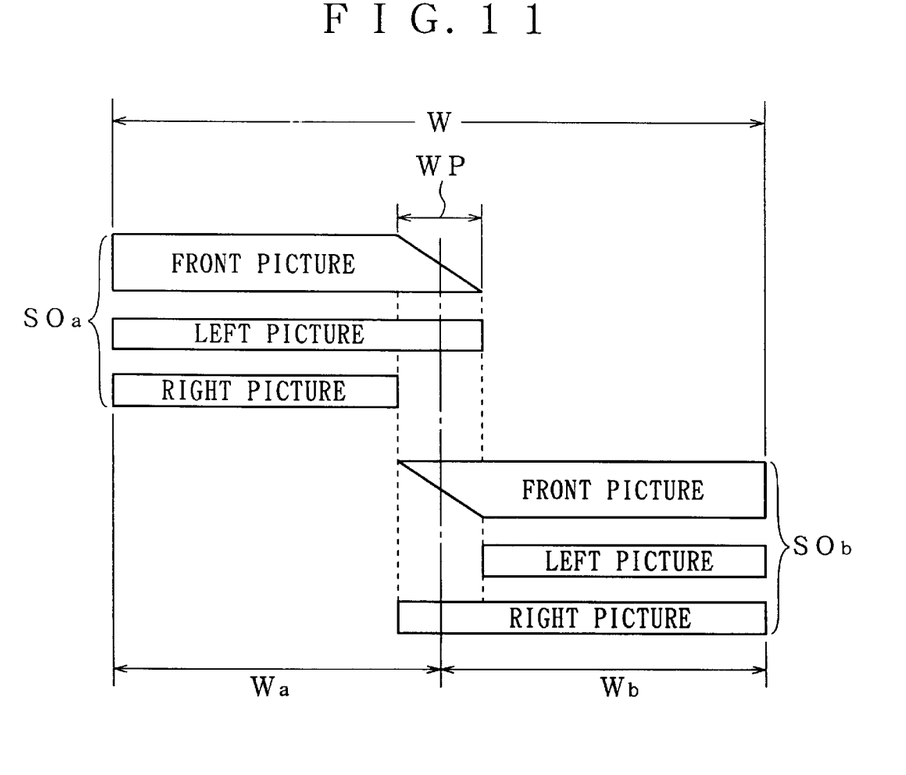
FIG. 11 is a diagram illustrating the relationship between video signals at switching between two screens.

Examples illustrative of the special effect process will be described continuously with reference to FIG. 10 and subsequent drawings. FIG. 10 shows an example in which solid pictures are switched in the center of the screen. The drawing shows a case where the solid pictures are switched so that a mixing ratio may be linearly varied within a width WP of a switching point p as shown in FIG. 11. It can be said that since the solid picture Soa is projected on the left side (=Wa) of the screen and the solid picture SOb is projected on the right side (=Wb) of the screen as shown in FIG. 10, right pictorial data of the solid picture SOa at the switching point p is data lower in importance than left pictorial data. It can be said that left pictorial data at the switching point p, of the solid picture SOb on the right side in contrast this is data low in importance. Therefore, data is truncated because the amount of data corresponding to one line is held constant. Whether the left and right pictorial data should be used up to within the width WP of the switching point p, varies according to the position of a fit screen.

Figure 12:
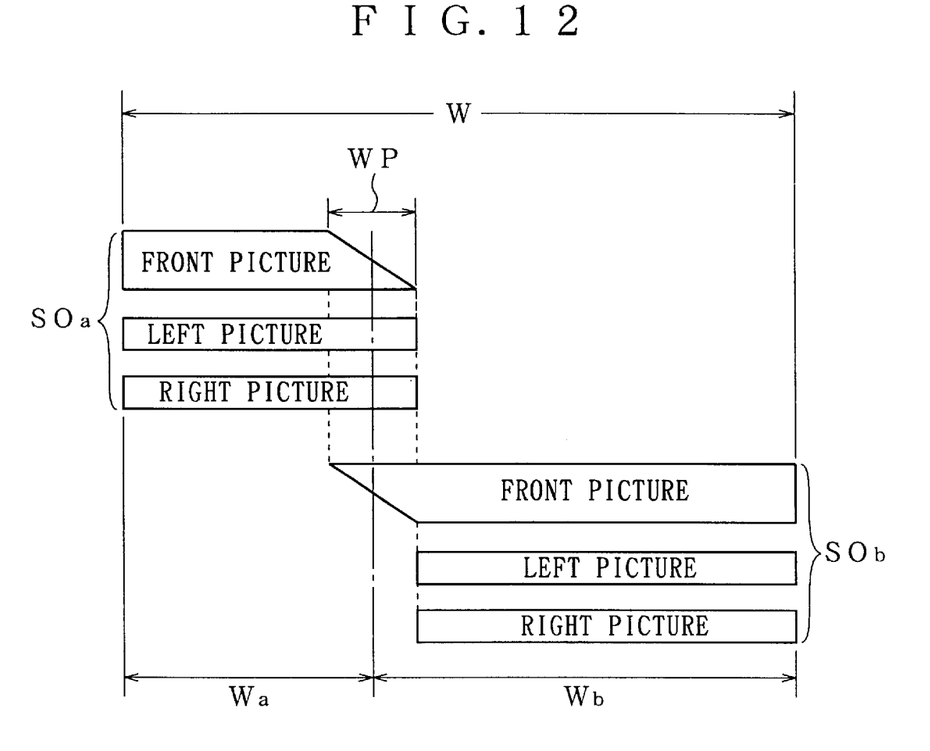
FIG. 12 is a diagram depicting the relationship between video signals at wipe switching.

Since left and right pictorial data about a new solid picture is important rather than the left and right pictorial data about the original solid picture when the solid picture is wipe-processed, the left and right pictorial data about the new solid picture are processed so as to be occupied within a width WP of a switching point p in such a case as shown in FIG. 12. FIG. 12 shows the relationship between pictorial data at the time that a new solid picture SOb is wiped to about ⅓ of the screen.

Figure 14:
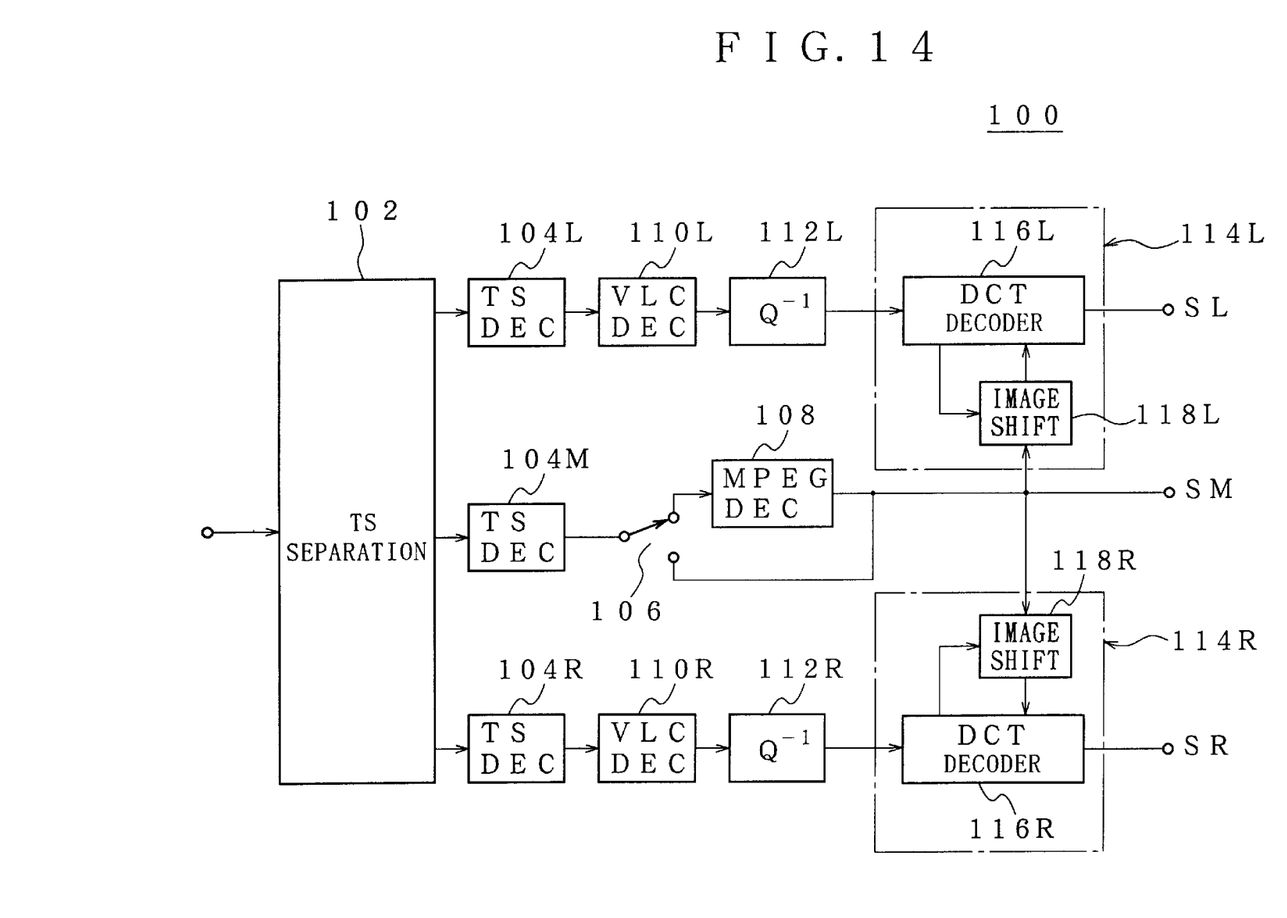
FIG. 14 is a systematic diagram illustrating one embodiment of a solid-pictorial video signal receiving apparatus according to the present invention.

A solid-pictorial video signal transmitted in transport stream form is received by a receiving device 100 shown in FIG. 14. First of all, the solid-pictorial video signal is separated from a multiplexed transport stream signal respectively into a front video signal and left and right video signals by a separation circuit 102. Of the separated transport stream signals, the transport stream signal corresponding to the front video signal is restored to the original variable-length code by a decoder 104M.

The variable-length code is supplied to an MPEG decoder 108 through a switch 106. When the front video signal is compressed and encoded by MPEG or the like, the switch 106 is positioned to an illustrated switched state, so that the variable-length code is inversely converted to the original video signal SM. When it is not compressed and encoded, the switch 106 is changed to the other switched state, so that decode processing is not performed.

Transport stream data about the left and right video signals are first restored to the original variable-length codes by decoders 104L and 104R, so that they in turn are supplied to decoders 110L and 110R for the variable-length codes wherein they are restored to quantized signals. Thereafter, the quantized signals are multiplied by a quantization value Q by dequantization circuits 112L and 112R respectively, so that they are restored to DCT coefficients. The DCT coefficients are respectively supplied to motion-compensated (prediction-decoded) DCT decoder units 114L and 114R.

The DCT decoder units 114L and 114R are respectively comprised of motion-compensated DCT decoders 116L and 116R and image shifters 118L and 118R. First, moving vectors extracted by the DCT decoders 116L and 116R are respectively supplied to the image shifters 118L and 118R wherein the front video signal (front picture) is shifted according to the moving vectors. As a result, pseudo left and right images or pictures are obtained. The pseudo left and right pictures are respectively returned to the DCT decoders 116L and 116R, so that they are restored to the left and right pictures (left and right video signals SL and SR) shown in FIG. 2B using information about the difference between the left and right pictures.

The restored front video signal is used when a two-dimensional image is projected. That is, it is supplied to an ordinary monitor as a video signal (picture signal). When it is desired to project the solid picture, the left and right video signals SL and SR are supplied to a CRT monitor (stereoscopic monitor) capable of projecting the solid picture or a stereoscopic monitor using a liquid crystal display device or the like.

A commercially-available goggle-type display device (e.g., Glasstron (trade name)) or the like can be utilized as the stereoscopic monitor. Left and right video signals are supplied to this display device. This display device is equivalent to the one in which liquid crystal display devices are respectively attached to spectacle lenses.

In the present invention as has been described above, the solid-pictorial video signals are generated by using the three video cameras.

According to this, the present invention has a feature that since simplified video cameras can be utilized as the video cameras placed on both sides of the front video camera, it is unnecessary to make adjustments for coincidences of camera characteristics of the three video cameras and since the simplified video cameras can be used, an apparatus can be reduced in cost.

In the present invention as well, when each solid-pictorial video signal is transmitted, only information about the difference between each of at least left and right video signals and a front video signal is encoded under compression and transmitted.

According to this, the present invention has a feature that the amount of total data of the solid-pictorial video signals can be reduced. Since the left and right video signals can be restored from the front video signal even if the amount of the data is reduced, degradation in the picture quality and the like does not occur.

Further, in the present invention, left and right video signals used as for a solid picture are restored from a front video signal received as a solid-pictorial video signal.

According to this, since the solid-pictorial information can be restored approximately accurately, the solid picture good in quality can be enjoyed. Since the front video signal is contained in the solid-pictorial video signal, the solid picture as well as a plane picture can be also enjoyed. Since, in this case, the plane picture is based on a video signal outputted from a video camera front to an object, a natural image can be enjoyed.

Moreover, in the present invention, when switching is done between a plurality of solid pictures by using a special effect process, compressed and encoded pictorial data are processed without decoding the original pictorial data.

According to this, the present invention has a feature that since a compression coding/expansion decoding process may not be repeated before and after a video switcher, for example, a solid special effect picture with less degradation in the image quality can be enjoyed.

Industrial Applicability

As has been described above, the solid-pictorial video signal generating apparatus according to the present invention and the video transmitting system using this video signal generating apparatus can be applied to a solid video generating apparatus employed in video studios intended for home and business (broadcast station or the like) and a system for transmitting solid video signals produced therefrom.

What is claimed is:

1. A solid-pictorial video signal transmitting apparatus, comprising:
    a front video camera generating a front picture;
    a pair of left and right video cameras placed with said front video camera interposed therebetween, said left and right video cameras generating left and right pictures, respectively, each overlapping said front picture;
    a first encoder unit for processing a front video signal outputted from said front video camera;
    second and third encoder units for respectively effecting a compressing process on left and right video signals outputted from said pair of left and right video cameras while referring to said front video signal thereby to generate respective left portion and right portion solid-pictorial video signals representing differences between the left and front pictures, and right and front pictures, respectively;
    a transport stream converter for converting the outputs of said respective first, second and third encoder units to transport stream signals;
    a multiplexing unit for multiplexing said transport stream signals; and
    a signal transmitting unit for transmitting a multiplexed solid-pictorial video signal;
    whereby at a receiving device, a two dimensional front picture is derivable from the front video signal alone, and a solid-pictorial image is obtainable from restored left and right pictures derived from the processed front, left portion and right portion video signals.

2. The solid-pictorial video signal transmitting apparatus according to claim 1,
    wherein said first encoder unit is an MPEG encoder, and said second and third encoder units are respectively provided with motion-compensated DCT encoder parts, each said DCT encoder part comprising:
    a motion predictor for comparing left and right pictures in frame units with said front video signal as a reference picture signal thereby to predict motion of the left and right pictures;
    a picture shifter for shifting said reference picture signal in frame units in the directions of predicted vectors obtained by said prediction; and
    a DCT converter for detecting a difference between the shifted reference picture signal and each of the left and right pictures and converting the difference into DCT form as a solid-pictorial video signal.

3. A solid-pictorial video signal generating apparatus, comprising:

left and right video cameras placed on opposite sides of a front video camera, the left, right and front video cameras generating left, right and front pictures of an object, respectively, wherein the left and front pictures overlap, and the front and right pictures overlap;

first extracting means for extracting a difference between the left and front pictures to derive a left portion video signal representing a left solid portion of the object;

second extracting means for extracting a difference between the right and front pictures to derive a right portion video signal representing a right solid portion of the object;

compression means for compression processing each of the left portion and right portion video signals and a front video signal representing the front picture; and transmitting means for transmitting the compression processed left portion, right portion and front video signals to a receiving device;

whereby at the receiving device, a two dimensional front picture of the object is derivable from the compressed front video signal, and a solid-pictorial image is obtainable from restored left and right pictures derived from the compressed front, left portion and right portion video signals.

* * * * *